3,235,535
AROMATIC VINYL SULFONES AND
POLYMERS THEREOF
Christian F. Horn, South Charleston, W. Va., assignor to Union Carbide Corporation, a corporation of New York
No Drawing. Filed Apr. 10, 1962, Ser. No. 186,309
11 Claims. (Cl. 260—79.3)

The present invention relates in important part to the production of novel polymerizable organic compounds, and is especially concerned in this regard with the production of aromatic vinyl sulfones, including ring-substituted sulfonic acid and alkali metal sulfonate derivatives thereof. The invention is also concerned with novel, normally solid polymers containing in polymerized form, acrylonitrile, vinyl chloride and a minor proportion of an aromatic vinyl sulfone of this invention.

More particularly, the aromatic vinyl sulfones of this invention can be represented by the general formula (I) 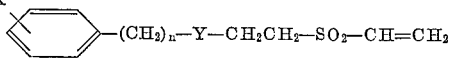

wherein X designates a sulfo (—SO₃H) or metallosulfo (—SO₃M) radical, M being an alkali metal atom, as for instance, a lithium, sodium, potassium, rubidium or cesium atom, etc., and preferably an alkali metal atom having an atomic number of from 3 to 19, i.e., a lithium, sodium, or potassium atom; Y designates oxygen or a tertiary N-alkylamine

radical, R being a methyl or ethyl radical; and $n$ designates an integer of from 0 to 4, preferably from 0 to 2, and more preferably 1.

As more specifically illustrative of the aromatic vinyl sulfones represented above by Formula I wherein Y designates oxygen, there can be mentioned:

2-ortho-sulfophenoxyethyl vinyl sulfone,
2-ortho-(lithiumsulfo)phenoxyethyl vinyl sulfone,
2-para-sulfophenoxyethyl vinyl sulfone,
2-para-(sodiumsulfo)phenoxyethyl vinyl sulfone,
2-para-(potassiumsulfo)phenoxyethyl vinyl sulfone,
2-ortho-sulfobenzyloxyethyl vinyl sulfone,
2-ortho-(lithiumsulfo)benzyloxyethyl vinyl sulfone,
2-para-sulfobenzyloxyethyl vinyl sulfone,
2-para-(sodiumsulfo)benzyloxyethyl vinyl sulfone,
2-(2-ortho-sulfophenylethoxy)ethyl vinyl sulfone,
2-(2-ortho-[lithiumsulfo]phenylethoxy)ethyl vinyl sulfone,
2-(2-para-sulfophenylethoxy)ethyl vinyl sulfone,
2-(2-para-[sodiumsulfo]phenylethoxy)ethyl vinyl sulfone,
2-(2-para-[potassiumsulfo]phenylethoxy)ethyl vinyl sulfone, and the like.

Similarly, as more specifically illustrative of the aromatic vinyl sulfones represented above by Formula I wherein Y designates an N-alkyl amine radical, there can be mentioned:

N-methyl-N-(2-vinylsulfonylethyl)-ortho-sulfophenylamine,
N-methyl-N-(2-vinylsulfonylethyl)-ortho-(lithiumsulfo)phenylamine,
N-methyl-N-(2-vinylsulfonylethyl)-para-sulfophonylamine,
N-methyl-N-(2-vinylsulfonylethyl)-para-(sodiumsulfo)phenylamine,
N-ethyl-N-(2-vinylsulfonylethyl)-para-(potassiumsulfo)phenylamine,
N-methyl-N-(2-vinylsulfonylethyl)-ortho-sulfobenzylphenylamine,
N-methyl-N-(2-vinylsulfonylethyl)-ortho-(lithiumsulfo)phenylamine,
N-methyl-N-(2-vinylsulfonylethyl)para-sulfophenylamine,
N-methyl-N-(2-vinylsulfonylethyl)-para-(sodiumsulfo)phenylamine,
N-ethyl-N-(2-vinylsulfonylethyl)-para-(potassiumsulfo)phenylamine,
N-methyl-N-(2-vinylsulfonylethyl)-2-ortho-sulfophenylethylamine,
N-methyl-N-(2-vinylsulfonylethyl)-2-ortho-(sodiumsulfo)phenylethylamine,
N-methyl-N-(2-vinylsulfonylethyl)-2-para-sulfophenylethylamine,
N-methyl-N-(2-vinylsulfonylethyl)-2-para-(sodiumsulfo)phenylethylamine,
N-ethyl-N-(2-vinylsulfonylethyl)-2-para-(potassiumsulfo)phenylethylamine, and the like.

The aromatic vinyl sulfones of this invention can be produced by various processes. Such compounds can, for instance, be obtained conveniently from commercially available starting materials by the steps which include the initial reaction of divinyl sulfone with either an aromatic alcohol or an aromatic amine depending upon the particular aromatic vinyl sulfone desired as the product. Such a reaction can be represented by the general equation:

(II) 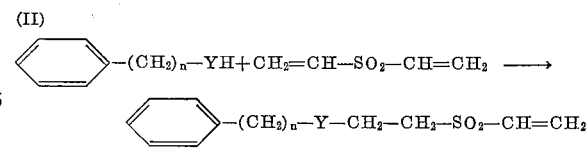

wherein Y and $n$ are as defined above.

Thus, it is to be noted that the aromatic alcohols which can be employed as a reactant include phenol, benzyl alcohol and 2-phenylethanol, etc.; while similarly suitable aromatic amine reactants include N-methylaniline, N-ethylaniline, N-methylbenzylamine, N-ethylbenzylamine, N-methyl-2-phenylethylamine, N-ethyl-2-phenylethylamine, and the like.

The reaction between divinyl sulfone and the aromatic alcohol or amine in accordance with Equation II is best carried out in the presence of a catalytic amount of a basic, i.e., alkaline, catalyst. Especially suitable basic catalysts include, for instance, organic quarternary ammonium hydroxides, such as benzyltrimethylammonium hydroxide, ortho-, meta-, and para-methylbenzyltrimethylammonium hydroxides, triethylhydroxyethylammonium hydroxide, and the like. However, other conventional organic basic catalysts, such as the corresponding quarternary ammonium alkoxides, and tertiary amines such as the trialkyl- and trihydroxyalkyl-amines, etc., can also be employed.

The catalyst, when employed, can be incorporated in the reaction mixture in any amount sufficient to catalyze the reaction. To this end, good results have been obtained, for instance, using a ratio in the range of from about 0.05 to about 5 weight percent of catalyst based upon the weight of the reactants, although catalytic amounts outside this range can also be used. Moreover, it has been found that the aromatic amine reactants described above are, in themselves, efficient catalysts for the reaction with divinyl sulfone thereby engendering an autocatalyzed reaction. Thus, the incorporation of additional catalyst, while permissable, is not necessary when using such reactants.

The ratio in which the reactants are employed can vary in the range of from 1 to about 20 or more moles of divinyl sulfone per mole of the aromatic alcohol or amine, with particularly efficient results being realized when utilizing the reactants in a ratio of from about 3 to about 7 moles of divinyl sulfone per mole of the aromatic alcohol or amine. Greater quantities of divinyl sulfone can also be used, although such use is attended by little, if any, additional advantage. However, the aromatic alcohol or amine should not be employed in a stoichiometric excess with regard to the amount of divinyl sulfone, so as to avoid the substantial production of dimer in which both vinyl groups of the sulfone undergo reaction.

While the reactants can be brought into reactive admixture in any convenient manner, the divinyl sulfone is preferably initially preheated to a temperature in the range of from about 60° C. or somewhat lower, to about 120° C. or somewhat higher, and more preferably from about 80° C. to about 100° C. The aromatic alcohol or amine, together with any catalyst employed, is then slowly introduced to the divinyl sulfone while maintaining the temperature of the reaction mixture within the aforementioned range.

When the aromatic alcohol or amine is a solid, the reactant is best introduced as a solution in an inert organic solvent, such as carbon tetrachloride, chloroform, methylene dichloride, benzene, decalin, methyl ethyl ketone, diisopropyl ether, or the like. Any catalyst employed is also conveniently incorporated in this solution.

Upon the complete admixture of the reactants and any catalyst employed, the reaction mixture is maintained within the aforementioned temperature range until the reaction producing the aromatic vinyl sulfone is complete or carried out to the extent desired. Excess divinyl sulfone can thereafter be removed from the crude reaction product, when desired in any convenient manner, such as by distillation under reduced pressure.

Upon cooling to room temperature, the aromatic vinyl sulfone product generally crystallizes out, and can be purified by recrystallization from an inert organic solvent such as benzene or isopropyl ether. Alternatively, the aromatic vinyl sulfone product can be recovered by distillation, such recovery technique being particularly preferred when the product is a liquid at room temperature.

The conversion of the unsulfonated aromatic vinyl sulfone to the corresponding ring-substituted sulfonic acid derivative, represented above by Formula I wherein X designates the sulfo radical, can be carried out by known sulfonation procedures. Thus, for example, the unsulfonated aromatic vinyl sulfone can be sulfonated by reaction with a mild sulfonating agent comprised of a mixture of sulfuric acid and acetic anhydride, at a temperature of from about −15° C. to about 50° C., and preferably from about 0° C. to about 25° C. The unsulfonated aromatic vinyl sulfone is best introduced to the sulfonating agent in solution, using, by way of illustration, an inert solvent such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the unsulfonated aromatic vinyl sulfone can vary from about 1 to about 3 moles of sulfuric acid per mole of the sulfone, with a ratio of from about 1 to about 1.2 moles of sulfuric acid per mole of the sulfone being preferred.

Produced as hereinabove described, the sulfonated aromatic vinyl sulfone can be recovered from the crude reaction product, if desired, in any convenient manner, such as by the esterification of the carboxyl groups present (from the acetic anhydride component of the sulfonating agent) using a suitable alcohol such as methanol, followed by the distillation of both the resulting acetate and excess alcohol. Alternatively, the sulfonated aromatic vinyl sulfone can be recovered after esterification by crystallization and filtration, preferably subsequent to the distillation of the acetate. Moreover, while the para-sulfo derivatives are most readily produced, other sulfonated derivatives, i.e., the ortho derivatives, etc. are also often formed, or can be obtained, by varying the sulfonation reaction in a manner determinable by those skilled in the art in light of this disclosure.

The sulfonated aromatic vinyl sulfone can thereafter be reacted with an alkali metal hydroxide or alkoxide, or an alkali metal salt of an acid weaker than sulfonic acid, such as acetic acid or benzoic acid, etc., to form the corresponding alkali metal sulfonate salt, i.e., metallosulfo derivative. Preferably, such a reaction is carried out in an alcoholic or aqueous solution and at a temperature of from about 5° C. to about 110° C., and preferably from about 20° C. to about 80° C.

The mole ratio of alkali metal hydroxide, alkoxide, or salt to the sulfonated aromatic vinyl sulfone can vary from about 1 to about 10 moles of the alkali metal-containing compound per mole of the sulfone, with a ratio of from about 1 to about 3 moles of the alkali metal-containing compound per mole of the sulfone being preferred. The alkali metal sulfonate thus produced can subsequently be recovered in any convenient manner, such as by filtration, or as the residue product obtained upon evaporation of any solvent present, etc.

The aromatic vinyl sulfones of this invention can be polymerized alone or with one or more monomers which are copolymerizable therewith to form homopolymers and interpolymers thereof which, in turn, can be used to produce films, as protective coatings, etc. In particular, it has been found that normally solid polymers containing, in polymerized form, acrylonitrile vinyl chloride and a minor proportion of one or more of the aromatic vinyl sulfones of this invention are especially useful in the production of films and modacrylic textile fibers having an improved dyeability and softening and melting point, as well as other improved physical properties.

Polymers containing acrylonitrile and vinyl chloride either as the sole polymerized monomers, or polymerized together with minor amounts of other monomers, such as vinylidene chloride, etc., are well known in the art. However, such polymers are ordinarily difficult to dye, and most often, do not have sufficient dye affinity to enable dyeing by the conventional dyeing techniques. In many instances, the dyes so applied are not light-fast or stable to laundering and dry-cleaning operations. In addition, the softening point of the polymers is ordinarily decreased to some extent by the presence of the vinyl chloride or other non-acrylonitrile component, as compared with the softening point of polyacrylonitrile.

The most frequently proposed method for improving the susceptibility of such polymers to dyeing with disperse and acid dyestuffs has been that of incorporating a basic monomer, such as methylvinylpyridine, in the polymer. However, while such basic monomers may improve the dye receptivity of the polymer in varying degree, their presence in the polymer may also engender other undesirable effects. For example, the color-stability of the polymer at elevated temperatures is often seriously impaired, as is the light-stability of the polymer. In other instances, the added monomer lowers the softening point of the polymer. Moreover, the effectiveness of any given monomer as a dye-assistant cannot necessarily be predicted when the environment in which it is employed is changed, that is to say, based upon its use in a substantially different polymer.

Other methods for improving the dyeability of such polymers have involved the production of graft copolymers, or the admixture of the polymer with a second polymer or other additive. All of these processes, however, achieve an improvement in dyeability at a sacrifice either in some other property of the polymer, or through an increase in the complexity of the procedures used in the production of the polymers.

It has now been found that polymers especially suitable for use in the production of high-softening, dyeable films and modacrylic textile fibers are those containing in the polymer molecule from about 35 to about 75 percent by weight of polymerized acrylonitrile, from about 10 to about 60 percent by weight of vinyl chloride, and from about 0.5 to about 10 percent by weight of a polymerized aromatic vinyl sulfone of this invention, wherein the sum of all of the copolymerized monomers is 100 percent. In addition, the polymers of this invention can contain one or more additional polymerized monomers, as for instance, vinylidene chloride, vinyl acetate, or the like, at concentrations ranging from about 5 to 20 percent by weight. In a preferred embodiment of this invention the proportion of polymerized acrylonitrile in the polymer molecule is from about 60 to about 75 percent by weight; of polymerized vinyl chloride, from about 20 to about 39 percent by weight, and of the polymerized aromatic vinyl sulfone, from about 1 to about 5 percent by weight, the sum of the copolymerized monomers again being 100 percent. Moreover, the preferred aromatic vinyl sulfones for use in this regard are the ring-substituted sulfonic acid and alkali metal sulfonate derivatives represented above by Formula I wherein X designates a sulfo or metallosulfo radical, and of these, the alkali metal sulfonate derivatives are especially preferred.

The polymers of this invention are readily produced at temperatures of from about 25° C. to about 70° C. by any of the usual polymerization processes. Thus, by way of illustration, bulk polymerization can be employed in which the monomers are mixed together with a polymerization catalyst and reacted at a temperature at which polymerization will occur. Emulsion and suspension polymerization processes can also be employed. These latter processes, as is known, are carried out in aqueous medium and generally employ free-radical-type polymerization catalysts, together with emulsifying or dispersing agents. Alternatively, solution polymerization can instead be used, in which case the monomers are dissolved in a suitable solvent and polymerized in contact with a polymerization catalyst. The catalysts employed are the conventional polymerization catalysts known in the art, such as the alkali metal persulfates, the peroxides, the alkali metal bisulfites, azo compounds, such as azodiisobutyronitrile, and the like.

Among the emulsifying and dispersing agents which can be used there can be mentioned the common soaps, such as potassium stearate, potassium palmitate, potassium laurate, etc.; the sulfonated hydrocarbons, such as sulfonated alkanes, sulfonated alkylbenzenes, sulfonated naphthalenes, etc.; the amine soaps, such as the salts of triethanolamine; the salts of formaldehyde-condensed alkyl-aryl sulfonics acids; sulfonated succinic esters; and the like.

Suitable solvents include, for example, acetone, acetonitrile, N,N-dimethylformamide, N,N-dimethylacetamide, dimethyl sulfoxide, and the like. In some instances, the presence of a small amount of water may also be desirable to aid solution. Moreover, up to about one percent or more of a chain terminator, as for instance, tertiary dodecyl mercaptan, 2-mercaptoethanol, thiourea, or the like, can also be added to the polymerization reaction mixture, if desired, to assist in regulating the molecular weight of the resulting polymer.

During the polymerization, a constant ratio of the monomers is preferably maintained in the reaction mixture by the intermittent addition of the various monomers as needed to achieve polymer uniformity. After the polymerization is complete the polymer is recovered and dried by conventional procedures. Either before or after recovery, one can add pigmenting agents, light stabilizers, heat stabilizers, oxidation inhibitors, etc., to the polymer.

As indicated above, it is well known that the copolymerization of a second monomer with acrylonitrile ordinarily lowers the softening point of the polymer produced therefrom. For instance, whereas conventional acrylic fiber-forming polyacrylonitrile polymers have a softening point greater than 300° C., modacrylic fiber-forming polymers such as an approximately 70/30 percent by weight acrylonitrile/vinyl chloride copolymer soften at about 220° C., while an approximately 60/40 percent by weight acrylonitrile/vinylidene chloride copolymer softens at about 185° C., and an approximately 40/60 percent by weight acrylonitrile/vinyl chloride copolymer softens at about 145° C. A similar lowering of the softening point occurs when a third monomer is introduced into a binary polymer system. Thus, an approximately 68/23/9 percent by weight acrylonitrile/vinyl chloride/methyl acrylate terpolymer has a softening point of 163° C., which is lower than that of an acrylonitrile/vinyl chloride copolymer having the same acrylonitrile content. Likewise, an approximately 68/24/4 percent by weight acrylonitrile/vinyl chloride/methyl methacrylate terpolymer softens at 214° C., which is a lower softening point than that of an acrylonitrile/vinyl chloride copolymer having the same acrylonitrile content.

In view of the foregoing, it was unexpected that the incorporation of aromatic vinyl sulfones as herein prescribed did not lower the softening point of the polymers of this invention, and in fact, that the softening points were higher than those of similar acrylonitrile- and vinyl chloride-containing polymers exclusive of the aromatic vinyl sulfones. For example, a terpolymer of acrylonitrile, vinyl chloride, and 2-para-sodiumsulfophenoxyethyl vinyl sulfone had a softening point about 20° C. higher than did the corresponding copolymer of acrylonitrile and vinyl chloride having about the same acrylonitrile content. This higher softening point is a distinct advantage, for example, in the production of modacrylic fibers from the polymers of this invention since it permits greater latitude in processing the fibers to produce other textile articles, and in the laundering and ironing of such articles. The higher softening points also minimize the possibility of damage resulting from excessive heating.

The polymers of this invention are readily soluble in the conventional solvents used in fiber spinning operation, such as, for example, acetone, acetonitrile, N,N-dimethylformamide, N,N-dimethylacetamide, gamma-butyrolactone, ethylene carbonate, ethylene carbamate, N-methyl-2-pyrrolidone, and the like, or mixtures thereof. As is known in the art, the solubility of a particular polymer in a solvent depends on the molecular weight of the polymer, the amount of each monomer polymerized therein, and the uniformity of the polymer. Fibers can then be produced by conventional wet- or dry-spinning techniques. After stretching the fibers to orient the molecules and develop the desired tensile properties, and heat-treating the fibers to improve their properties, the fibers produced from the polymers of this invention can be employed in the many applications in which modacrylic fibers are generally employed. During the fiber-forming operations, small amounts of various stabilizers can be added in order to stabilize the spinning solution and/or fibers against decomposition by heat, light, or oxidation. Illustrative of such stabilizers are the organic tin and lead salts of carboxylic acids, such as dibutyl tin dimaleate, and the like. Alternatively, the polymer solutions can be used to cast films suitable for use as packaging and coatings.

The average molecular weights of the polymers of this invention can be determined by their specific viscosities, which vary in the range of from about 0.1 to about 0.6, and preferably from about 0.2 to about 0.5, when measured at a temperature of 20° C. from an N,N-dimethylformamide solution of the polymer. These values are determined using a size 100 Ubbelohde viscosimeter, and are calculated in accordance with the following formula:

Specific viscosity =

$$\left[\frac{\text{Viscosity of a solution of 0.2 grams of resin in 100 ml. of N,N-dimethylformamide}}{\text{Viscosity of N,N-dimethylformamide}}\right] - 1$$

The fibers and films produced from the polymers of this invention are readily dyed by conventional dyeing techniques with a wide variety of dyestuffs to produce highly colored fibers of desirable properties. The fibers are dyed to deeper shades and absorb more dye from the dyebath than do the modacrylic fibers produced from similar acrylonitrile- and vinyl chloride-containing polymers exclusive of the aromatic vinyl sulfone. Moreover, this improvement in dyeability is attainable even without the use of dye-assistants, such as a swelling agent, in the dyebath. The fibers and films produced from the polymers of this invention also have good wet- and dry-tensile strengths and elongations, good flexibility, elasticity and resilience, as well as resistance to water and various chemical agents including acids and dilute alkalies, and to bacterial and fungal growths.

That the polymers of this invention are more readily dyed, and dyed to deeper shades, is apparent from visual observation and comparison. A quantitative measurement of the amount of dyestuff absorbed is also available, as determined by the following procedure. A piece of dyed and scoured film or fabric prepared from the polymer, weighing about 0.2 gram after drying, is dissolved in 50 milliliters of N,N-dimethylformamide containing 0.25 milliliter of acetic acid. The transmission of this solution at the appropriate wave-length is measured using a Beckman Model B spectrophotometer. The amount of dyestuff in this solution, which is equal to the amount of dyestuff absorbed by the 0.2 gram-sample of polymer is read directly from a curve plotting transmission versus the concentration of dyestuff in N,N-dimethylformamide. By simple proportion, the amount of dyestuff absorbed by the total weight of the polymer is calculated. The percentage of the total amount of available dyestuff that is absorbed by the polymer is calculated by means of the equation:

$$\left[\frac{\text{Amount of dye absorbed}}{\text{Amount of dye originally available in the dyebath}}\right] \times 100 = \text{Percent}$$

Among the dyestuffs which can be used by dye the polymers of this invention one can mention the Genacryl dyes discussed on pages 432 to 433 of the American Dyestuff Reporter, volume 43, 1954, for example, Genacryl Red 6B (a basic dye of the quarternary ammonium type), Genacryl Pink G (Basic Red 13; Color Index No. 48,015), Genacryl Blue 6G; Celliton Fast Blue AF Ex. Conc. (Disperse Blue 9; Color Index No. 61,115); Celliton Fast Red GGA Ex. Conc. (Disperse Red 17; Color Index No. 11,210); Fuchsine SBP (a basic dye of the triphenylmethano type); Fuchsine Conc. Basic Violet 14 (Color Index No. 12,510); Methyl Violet 2B; Brilliant Blue 6G; Methylene Blue SP; Victoria Green WB (Color Index No. 657); Victoria Green (Basic Green 4; Color Index No. 42,000); Rhodamine B (Color Index No. 749); Brilliant Green B (Color Index No. 662); Sevron Brilliant Red 4G; Maxilon Red BL; Basacryl Blue GL; and the like.

The following examples further serve to illustrate the invention but are not intended to limit it in any manner whatsoever since variations thereof within the scope of this disclosure would be readily apparent to the ordinary skilled scientist in the art. In the examples, the amounts indicated are in parts by weight, unless otherwise stated. A group of polymerization experiments was also carried out to produce polymers free of aromatic vinyl sulfones for control purposes.

EXAMPLE I

One hundred eighteen grams of divinyl sulfone is placed in a 500 milliliter, 4-necked flask equipped with a stirrer, condenser, dropping-funnel, and thermometer, and heated to a temperature of 85° C. A solution containing 19 grams of phenol, 1 gram of a 35 percent methanol solution of benzyltrimethylammonium hydroxide, and 30 cubic centimeters of carbon tetrachloride is added dropwise to the divinyl sulfone while maintaining the temperature of the reaction mixture in the range of from 85° C. to 90° C. The reaction mixture is then heated at a temperature of about 85° C. for an additional period of 30 minutes, after which excess divinyl sulfone is distilled off under reduced pressure. Upon cooling, solidification of the residue occurs, and after recrystallization from benzene and from isopropyl ether, 2-phenoxyethyl vinyl sulfone is recovered as white crystals having a melting point in the range of from 85° C. to 87° C. In similar manner, 2-(phenylethoxy)ethyl vinyl sulfone is obtained by the substitution of an equimolar amount of 2-phenylethanol for phenol in the above reaction.

EXAMPLE II

In the manner described above in Example I, 236 grams of divinyl sulfone is reacted with a solution containing 38 grams of benzyl alcohol, 1 gram of a 35 percent methanol solution of benzyltrimethylammonium hydroxide, and 30 cubic centimeters of carbon tetrachloride to produce 2-benzoxyethyl vinyl sulfone. Upon distillation at a temperature of about 160° C., under a reduced pressure of less than 1 mm. of mercury, the product is recovered as a colorless liquid having a refractive index at a temperature of 30° C. ($n_D^{30}$) of 1.5305.

EXAMPLE III

Using equipment similar to that described above in Example I, 48 grams of N-methylbenzylamine is added dropwise to 236 grams of divinyl sulfone while maintaining the reaction mixture at a temperature of about 80° C. The reaction mixture is then heated at a temperature of about 80° C. for an additional period of one hour, after which excess divinyl sulfone is distilled off under reduced pressure. In this manner, N-methyl-N-(2-vinylsulfonylethyl)benzylamine is produced, the product being recovered as a liquid upon subsequent distillation at a temperature of about 152° C., under a reduced pressure of less than 1 mm. of mercury. In similar manner, N-methyl-N-(2-vinylsulfonylethyl)phenylamine and N-ethyl-N-(2-vinylsulfonylethyl)-2-phenylethylamine are obtained, independently, by the substitution of equimolar amounts of N-methylaniline and N-ethyl-2-phenylethylamine for N-methylbenzylamine in the above reaction.

EXAMPLE IV

To a 1 liter, 4-neck flask, equipped with a stirrer, condenser, thermometer, and dropping funnel, 63.6 grams of 2-phenoxyethyl vinyl sulfone, 240 grams of acetonitrile, and 61 grams of acetic anhydride are charged and cooled to a temperature of about 0° C. To this charge, 29.4 grams of sulfuric acid (s.p. g. 1.84) are then added dropwise over a period of 55 minutes while maintaining the temperature of the reaction mixture in the range of from 0 to 5° C. The reaction mixture is then maintained at a temperature of about 5° C. for an additional period of 3 hours. In this manner, a solution of 2-para-sulfophenoxyethyl vinyl sulfone is obtained as a product. To this product, 24.6 grams of sodium acetate is added over a period of 10 minutes, and the resuting mixture is then stirred for a period of one hour at a temperature of about 10° C. A precipitate is formed, and upon filtration and recrystallization twice from acetic acid, 70 grams of essentially pure 2-para-(sodiumsulfo)-phenoxyethyl vinyl sulfone, are recovered as a solid which discolors at a temperature of 250° C. and does not melt at temperatures up to 350° C.

*Elemental analysis.*—Calcd. for $C_{10}H_{11}O_6S_2Na$: C, 38.21%; H, 3.53%. Found: C, 38.44%; H, 3.20%.

In similar manner, 2-para-(potassiumsulfo)benzyloxyethyl vinyl sulfone and 2-(para-[sodiumsulfo]phenylethoxy)ethyl vinyl sulfone are obtained, independently, by the substitution in the above reaction of equimolar amounts of 2-benzoxyethyl vinyl sulfone and 2-(2-phenylethoxy)ethyl vinyl sulfone for 2-phenoxyethyl vinyl sulfone, and in the former instance, by the additional substitution of an equimolar amount of potassium acetate for sodium acetate.

EXAMPLE V

Using equipment similar to that described above in Example IV, 44 grams of sulfuric acid is added dropwise to 102 grams of acetic anhydride at a temperature of about 0° C. To this cooled solution, 48 grams of N-methyl-N-(2-vinylsulfonylethyl)benzylamine is added dropwise while maintaing the reaction mixture at a temperature in the range of from 0° C. to 10° C. The reaction mixture is then maintained at a temperature of about 5° C. for an additional period of 7 hours, packed in a wet ice bath overnight, and finally allowed to warm to room temperature upon standing. In this manner, a solution of N-methyl-N-(2-vinylsulfonylethyl) - para-benzylamine is obtained as a product. To this product, 250 cubic centimeters of methanol are added to esterfy the carboxyl groups present (from the acetic anhydride component of the sulfonating agent) and the methyl acetate thereby formed is removed by distillation, followed by the addition of methanol to maintain a solution. This solution is then treated with charcoal and titrated to a pH of 7.2 with methanolic sodium hydroxide. A precipitate is formed and upon filtration and recrystallization twice from acetic acid, 41 grams of N-methyl-N-(2-vinylsulfonylethyl) - para - (sodiumsulfo)benzylamine are recovered as a white solid having a melting point in the range of from 217° C. to 221° C. In similar manner, N-methyl-N-(2-vinylsulfonylethyl) - para - (potassiumsulfo)phenylamine and N - ethyl - N - (2-vinylsulfonylethyl) - 2 - para - (sodiumsulfo)phenylethylamine are obtained, independently, by the substitution in the above reaction of equimolar amounts of N-methyl-N - (2 - vinylsulfonylthyl)phenylamine and N - ethyl-N - (2 - vinylsulfonylethyl) - 2 - phenylethylamine for N - methyl - N - (2 - vinylsulfonylethyl)benzylamine, and in the former instance, by the additional substitution of an equimolar amount of potassium hydroxide for sodium hydroxide.

EXAMPLE VI

To a 1.5 gallon stainless steel autoclave there are charged 250.4 grams of acrylonitrile, 13.4 grams of 2-(para-[sodiumsulfo]phenoxy)ethyl vinyl sulfone, 3192.0 grams of distilled water, 12.0 grams of dioctyl sodiumsulfosuccinate, 0.64 gram of phosphoric acid, 0.52 gram of 2-mercaptoethanol, and 0.80 gram of sodium bisulfite. The charge is then purged with nitrogen. Thereafter, the autoclave is closed, 536.0 grams of vinyl chloride is added to the contents therein, and the autoclave is vented. Upon heating and maintaining the charge at a temperature of 50° C., accompanied by agitation, polymerization is initiated by the addition of potassium persulfate to the charge by means of a metering pump. During the polymerization, further quantities of the catalyst components, i.e., both the persulfate and the bisulfite, are added to the charge in an amount sufficient to maintain a polymerization rate of about 8 percent conversion per hour. Further quantities of dioctyl sodiumsulfosuccinate, phosphoric acid and 2-mercaptoethanol are also added periodically at rates sufficient to maintain constant ratios to the reactive monomers present. In addition, further quantities of combined reactive monomers are added at a rate of about 0.555 gram of the monomers per gram of polymer thereby produced. In this manner, after a polymerization period of 4.83 hours, there are obtained 399 grams of a terpolymer of vinyl chloride, acrylonitrile and 2-para-(sodiumsulfo)phenoxyethyl vinyl sulfone, containing about 63.0 percent by weight of polymerized acrylonitrile, and about 29.4 percent by weight of polymerized vinyl chloride, and having a reduced viscosity of 1.38 in N,N-dimethylformamide at a temperature of 30° C. Films of this polymer, cast from a dimethylformamide solution, are dyed with Genacryl Pink G and Celliton Fast Red GGA. The percent dyestuff absorbed by the polymer, calculated as indicated above, is tabulated below in Table A. Also tabulated as a control is the percent dyestuff absorbed by a copolymer containing about 70 percent by weight of polymerized acrylonitrile and about 30 percent by weight of polymerized vinyl chloride.

*Table A*

| Polymer | Percent Dyestuff Absorbed | |
|---|---|---|
| | G.P.[1] | CFR[2] |
| Terpolymer | 28 | 23 |
| Copolymer | 7 | 7 |

[1] Genacryl Pink G.
[2] Celliton Fast Red GGA.

From the above table, the improved dyeability of the polymer of this invention can readily be seen. In addition, the polymer evidences an improved sticking temperature of about 230° C. as compared with the conventional acrylonitrile-vinyl chloride copolymer. In similar manner, polymers having improved dyeability are obtained by the terpolymerization of acrylonitrile and vinyl chloride with, independently, 2-para-(potassiumsulfo)benzyloxyethyl vinyl sulfone, 2-(2-para-[sodiumsulfo]phenylethoxy)ethyl vinyl sulfone, N-methyl-N-(2-vinylsulfonylethyl) - para - (sodiumsulfo)benzylamine, N - methyl - N - (2 - vinylsulfonylethyl) - para - (potassiumsulfo)phenylamine, and N - ethyl - N - (2-vinylsulfonylethyl) - 2 - para - (sodiumsulfo)phenylethylamine. Useful polymers are also prepared in similar manner using the corresponding unsulfonated aromatic vinyl sulfones.

What is claimed is:

1. The aromatic vinyl sulfone of the formula:

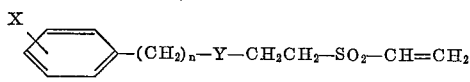

wherein X is selected from the group consisting of the —$SO_3H$ and —$SO_3M$ radicals, M being an alkali metal atom; Y is oxygen and $n$ is an integer of from 0 to 2.

2. 2-para-(sodiumsulfo)phenoxyethyl vinyl sulfone.

3. 2-para-(potassiumsulfo)benzyloxyethyl vinyl sulfone.

4. 2-(2-para-[sodiumsulfo]phenylethoxy)ethyl vinyl sulfone.

5. The dyeable, fiber-forming solid polymer of from about 35 to about 75 percent by weight of polymerized acrylonitrile, from about 10 to about 60 percent by weight of polymerized vinyl chloride, and from about 0.5 to about 10 percent by weight of at least one polymerized aromatic vinyl sulfone of the formula:

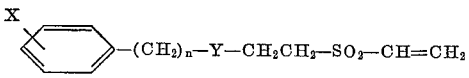

wherein X is selected from the group consisting of the —$SO_3H$ and —$SO_3M$ radicals, M being an alkali metal atom; Y is selected from the group consisting of oxygen and the —NR— radicals, R being selected from the group consisting of methyl and ethyl; and $n$ is an integer of from 0 to 2.

6. The solid polymer according to claim 5 wherein the aromatic vinyl sulfone is 2-para-(sodiumsulfo)-phenoxyethyl vinyl sulfone.

7. The solid polymer according to claim 5 wherein the aromatic vinyl sulfone is 2-para-(potassiumsulfo)-benzyloxyethyl vinyl sulfone.

8. The solid polymer according to claim 5 wherein the aromatic vinyl sulfone is 2-(2-para-[sodiumsulfo]-phenylethoxy)ethyl vinyl sulfone.

9. The solid polymer according to claim 5 wherein the aromatic vinyl sulfone is N-methyl-N-(2-vinylsulfonylethyl)-para-(sodiumsulfo)benzylamine.

10. The solid polymer according to claim 5 wherein the aromatic vinyl sulfone is N-methyl-N-(2-vinylsulfonylethyl)-para-(potassiumsulfo)phenylamine.

11. The solid polymer according to claim 5 wherein the aromatic vinyl sulfone is N-ethyl-N-(2-vinylsulfonylethyl)-2-para-(sodiumsulfo)phenylethylamine.

References Cited by the Examiner

UNITED STATES PATENTS 2,324,896  7/1943  Zerweck et al. _____ 260—79

FOREIGN PATENTS 1,010,063  6/1957  Germany.

OTHER REFERENCES

Noller: Chemistry of Organic Compounds, 1957, pages 466–474.

JOSEPH L. SCHOFER, *Primary Examiner.*

W. H. SHORT, *Examiner.*